United States Patent [19]
Peterson

[11] Patent Number: 6,041,219
[45] Date of Patent: Mar. 21, 2000

[54] INTEGRATED ORTHOGONAL MODE TRANSDUCER/FILTER DESIGN FOR MICROWAVE FREQUENCY-DOMAIN

[75] Inventor: Dean F. Peterson, Groton, Mass.

[73] Assignee: Wytec, Incorporated, Santa Clara, Calif.

[21] Appl. No.: 09/164,574

[22] Filed: Oct. 1, 1998

[51] Int. Cl.[7] ....................................................... H04B 1/40
[52] U.S. Cl. .............................. 455/81; 455/128; 333/242
[58] Field of Search .................................. 455/73, 78, 80, 455/81, 82, 83, 90, 128, 129; 330/239, 242, 245, 247, 248, 250

[56] References Cited

U.S. PATENT DOCUMENTS

| | | | |
|---|---|---|---|
| 4,473,828 | 9/1984 | Mölz et al. | 455/81 |
| 4,777,654 | 10/1988 | Conti | 455/81 |

*Primary Examiner*—Thanh Cong Le
*Attorney, Agent, or Firm*—Burns Doane Swecker & Mathis L.L.P.

[57] ABSTRACT

A printed circuit board (PCB) transceiver I/O filter design which provides both polarization and isolation filtering includes a receive probe positioned in a first orientation in an opening of the PCB which has a feed waveguide attached to it on a first side of the PCB. Receive signals propagate into the feed waveguide and excite the probe causing the receive probe to couple the received signals to receive circuitry. The transceiver design further includes an enclosed waveguide structure attached to the PCB having a first end positioned over the PCB opening and a second end positioned over a transmit probe which is positioned in a second orientation orthogonal to the receive probe. The transmit probe is excited by transmit circuitry and couples signals into the waveguide structure through the PCB opening and out the feed waveguide. Since the transmit probe is orthogonally oriented with respect to the receive probe, transmit signals emitted by the transmit probe are polarized orthogonally with respect to the receive signals thereby providing polarization isolation of the receive and transmit signals in the feed waveguide and the PCB opening area. The enclosed waveguide can be constructed to have an associated cut-off frequency that is greater than the maximum frequency of the receive signals thereby providing isolation filtering in the enclosed waveguide of signals in the receive signal frequency range. Alternatively, the waveguide structure can be designed as a bandpass filter to provide isolation filtering between receive and transmit signals.

9 Claims, 7 Drawing Sheets

INTEGRATED ORTHOGONAL MODE TRANSDUCER/FILTER DESIGN FOR MICROWAVE FREQUENCY-DOMAIN

BACKGROUND OF THE INVENTION

1. Field of The Invention

The present invention relates to transceivers, and in particular to microwave frequency-domain radio transceivers using a single antenna with an orthogonal mode transducer and bandpass filtering to separate and isolate transmit and receive signals.

2. State of The Art

Figure 1:
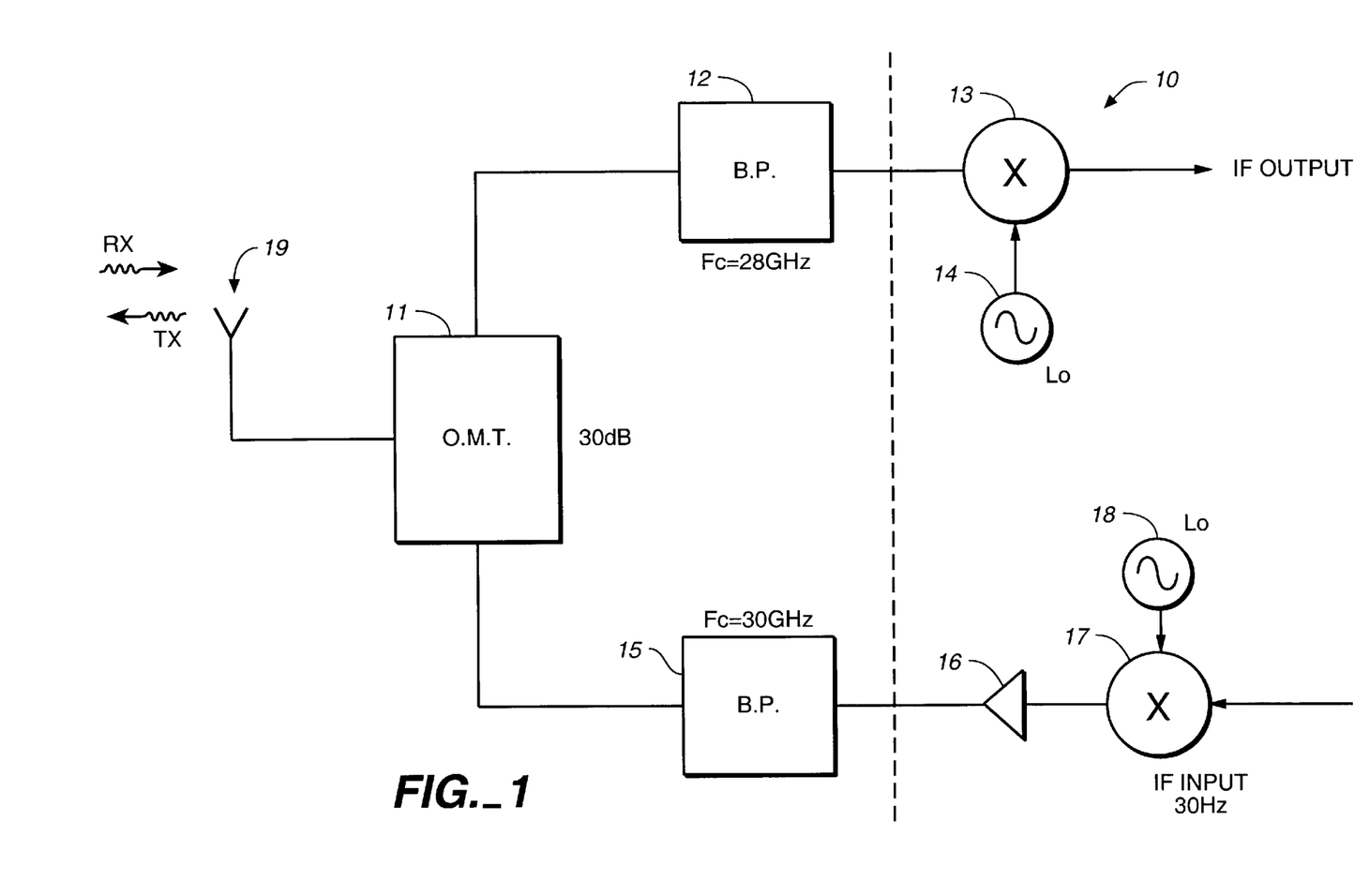
FIG. 1 is a typical prior art block diagram of a transceiver including an orthogonal mode transducer (O.M.T.) and bandpass filters for isolating between transmit and receive signals.

A radio transceiver is designed to perform both functions of receiving and transmitting communication signals and as such the transceiver needs to be designed to ensure that the transmit and receive signals do not interfere with each other. FIG. 1 shows a typical transceiver designed to minimize interference between received and transmitted signals. As shown, the transceiver 10 includes a transmit branch, a receive branch, a single antenna for transmitting and receiving orthogonally polarized signals and an orthogonal mode transducer (O.M.T. 11).

The antenna receives signals at a first frequency and transmits signals at a second frequency separated from the first frequency by a predetermined bandwidth. The O.M.T. provides polarization isolation between the two branches, and in particular, a linear polarization O.M.T. functions to maintain a 90 degree spatial difference between the E-fields of the individual receive and transmit guided mode signals in the vicinity of the antenna.

The receive branch includes a bandpass filter (B.P. 12) centered at the frequency of the receive signal such that it passes any signals in this range and rejects signals in the transmit signal range. For instance, if the receive frequency is 28 Giga Hz and the transmit frequency is 30 Giga Hz then B.P. 12 would be tuned to pass 28 Giga Hz signals and reject signals at 30 Giga Hz. It is well known in the field of circuit design that a bandpass filter is designed to allow certain signal frequencies to pass while rejecting other signals at varying degrees of power levels. The rejection level is dependent upon the frequency separation with higher rejection possible as the separation increases. For instance in the case in which the B.P. filter 12 rejects 30 GHz signals by 30 dB, when filtering a 30 GHz signal at 1 m Watt, only a 30 GHz signal at 1 $\mu$Watt is leaked to the receiver mixer 13 having an insignificant affect on the mixer 13. The mixer 13 multiplies the high frequency receive signal with a lower frequency signal, LO 14, to generate a received IF output signal that is more suitable for signal processing.

The transmit side also includes a bandpass filter, however, this filter is tuned to pass signals in the frequency range of the transmit signals and reject signals in the frequency range of the receive signals. For instance, B.P. 15 passes 30 Ghz transmit signals and rejects receive signals in the range of 28 Ghz. The purpose of this filter is to reject noise generated by amplifier 16 having frequencies in the receive signal range which may leak over to the receiver branch.

Typically, the input/output (I/O) portion of the above circuit (i.e., antenna 19, O.M.T. 11, B.P.12, and B.P. 15) has been implemented with common discrete waveguiding elements and in particular, in the case of a microwave frequency design, orthogonal mode waveguide coupling structures have been used as well in combination with microwave bandpass filter designs.

The present invention is a low cost unique transceiver I/O OMT-Filter design implementation which effectively and easily provides both isolation and polarization filtering of transmit and receive signals on a PCB-based structure.

SUMMARY OF THE INVENTION

The present invention is a printed circuit board (PCB) transceiver I/O filter design which provides polarization and isolation filtering. In general, the PCB transceiver design includes at least an enclosed waveguide structure positioned between receive and transmit signal sources, such as signal probes, for isolating orthogonally oriented transmit and receive signals.

In one embodiment in which transmit and receive signal frequencies are separated by a first relatively wide band gap, the enclosed waveguide structure is designed to have a cut-off frequency higher than one of the transmit or receive signals thereby providing frequency isolation between signals. In accordance with this embodiment, the I/O filter includes a first feed type waveguide having a first end for receiving and transmitting signals and a second end fixedly attached to an opening in the PCB. A first probe, positioned in the opening of the PCB, is excited by received signals in a first frequency band with proper polarization. The filter further includes a second wave guide formed by an enclosed waveguide structure fixedly attached to the PCB so as to form an enclosed waveguide area having a first end positioned over the PCB opening and a second end positioned over a second probe which is excitable so as to transmit signals having a second frequency band in the enclosed waveguide. The second probe is orthogonally oriented with respect to the first probe so that transmit signals emitted by the second probe are polarized orthogonally with respect to the receive signals thereby providing polarization isolation in the feed waveguide and the PCB opening area. Moreover, the enclosed waveguide is constructed to have an associated cut-off frequency for the guided mode with receive signal polarization that is much greater than the maximum frequency of the receive signals thereby preventing any loss of receive signal energy through this waveguide. Additionally, the enclosed waveguide is constructed to provide suitable rejection in the receive frequency band of signals having the sense of transmit polarization. This embodiment can also further include microwave transmit circuitry for exciting the second probe thereby causing it to emit transmit signals and includes microwave receive circuitry for receiving and processing signals received by the first probe.

A variation of this embodiment is one in which the transmit and receive circuitry can be interchanged such that the enclosed waveguide is constructed to have a cut-off frequency for the guided mode with transmit signal polarization that is much greater than the maximum frequency of the transmit signals.

In still another embodiment of the PCB transceiver embodiment in which transmit and receive signal frequencies are separated by a second relatively narrow band gap, the enclosed waveguide structure is designed as a waveguide bandpass filter which provides frequency isolation between the transmit and receive signals instead of using the waveguide structure's cut-off frequency.

BRIEF DESCRIPTION OF THE DRAWINGS

The present invention may be further understood from the following written description in conjunction with the appended drawings. In the drawings.

DETAILED DESCRIPTION OF THE PREFERRED EMBODIMENTS

Figure 2:
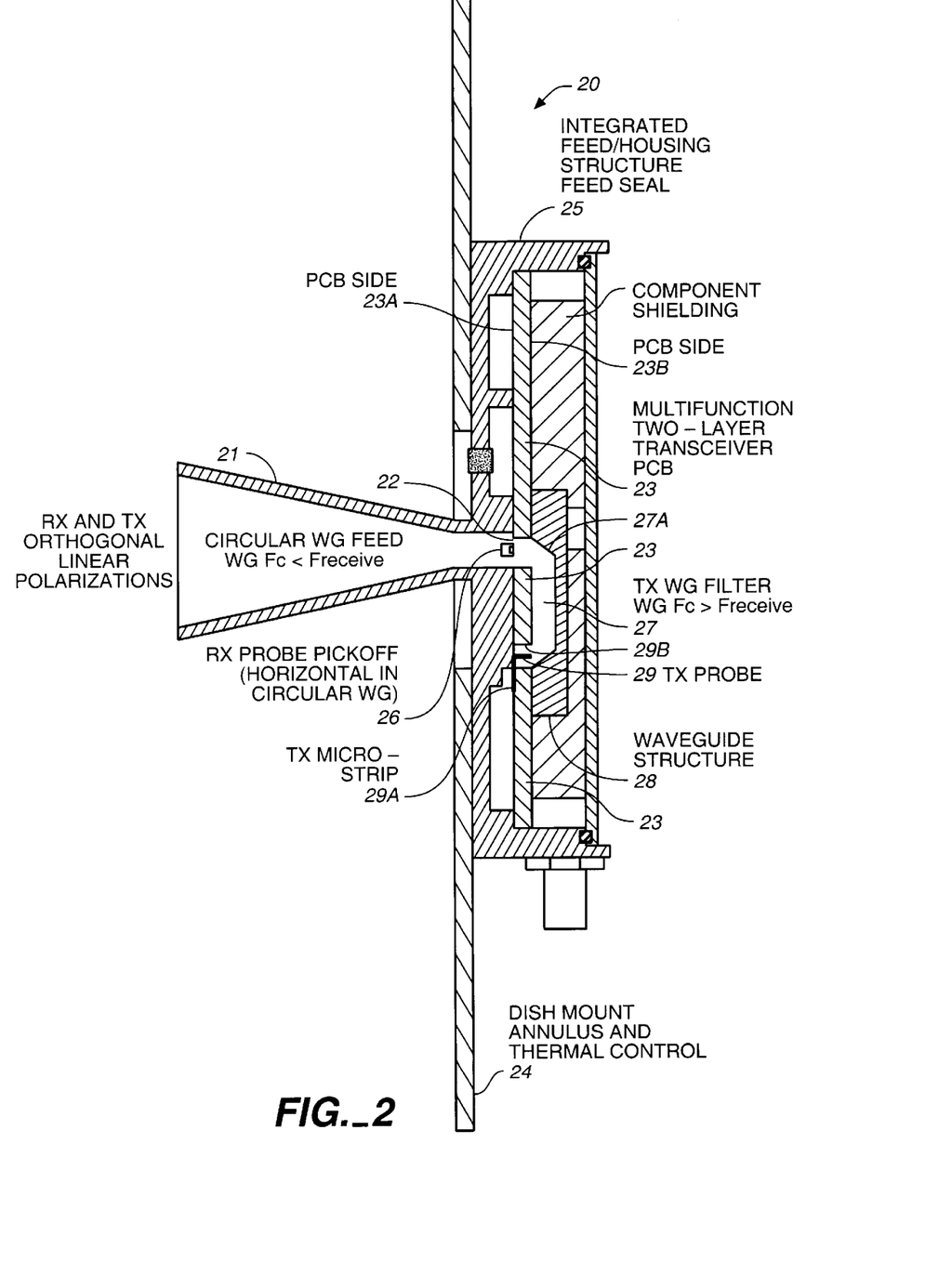
FIG. 2 shows a first embodiment of a PCB transceiver I/O filter design implemented on a PCB for providing signal isolation.

The present invention is an input/output (I/O) filter design for a microwave transceiver implemented on a PCB and in particular a filter adapted for the microwave frequency range. FIG. 2 shows a first embodiment of the I/O filter design 20 which includes feed waveguide 21. The feed waveguide has a first end for receiving and transmitting signals and a second end fixedly attached on a first PCB side 23A over an opening 22 in a printed circuit board (PCB) 23. It should be noted that in one embodiment, the opening is a circular opening and the feed waveguide is a circular waveguide which supports orthogonal modes for the transmit and receive signals.

It should also be noted that a dish mount annulus and thermal control portion 24 and an integrated feed/housing structure and feed seal 25 are not within the scope of the present invention and instead are elements which are included to perform structural and thermal functions which can be implemented in numerous other manners.

Figure 6:
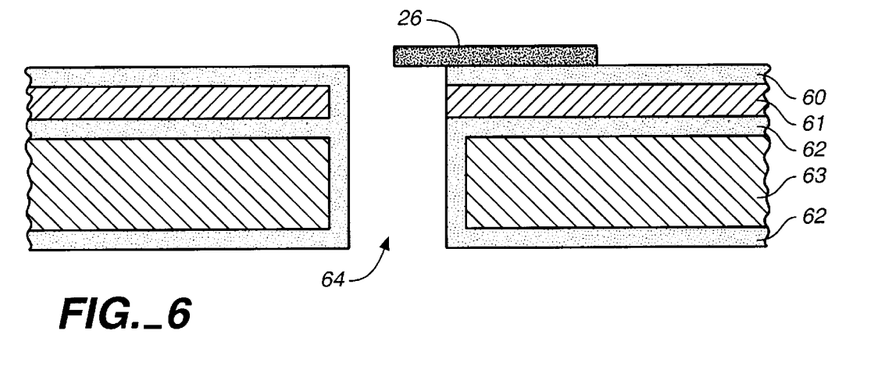
FIG. 6 shows one embodiment of a receive probe used in the PCB I/O filter design shown in FIG. 4.

Positioned within the opening 22 is a first receive (RX) probe 26 oriented in a first position. In the embodiment shown in FIG. 2, probe 26 is oriented in a horizontal position in the same plane as the PCB. FIG. 6 shows a detailed diagram of the arrangement of the RX probe 26 on PCB 23. The probe 26 is attached onto a microstrip 60 formed on a microstrip dielectric layer 61. The microstrip ground plane layer 62 is sandwiched between the dielectric 61 and a support layer of metal or other dielectric material 63. The circular opening is metalized on the sides to form a short section of circular waveguide. As shown, the RX probe 26 extends into the circular opening area 64 (corresponding to area 22 in FIG. 2) where the feed waveguide (not shown in FIG. 6) is fixedly attached. The probe is excited by receive signals entering the first end of the feed waveguide 21. The received signals are coupled through the feed waveguide onto the PCB microstrip 60 (FIG. 6) which, in turn, couples the received signals to other receive circuitry (not shown) on the PCB. In the embodiment shown in FIG. 2, the PCB microstrip 60 and receive circuitry are formed on side 23A of PCB 23.

On the other side 23B of PCB 23 is a second waveguide 27 formed by an enclosed waveguide structure 28 fixedly attached to the PCB. In one embodiment, the enclosed waveguide structure 28 (shown in FIGS. 8A and 8B) have first and second ends, 80 and 81, respectively, an outer top area 82, an inner waveguide area portion 83, and first and second sides, 84 and 85. Surface 86 is fixedly attached to the PCB such that the first end 80 is positioned over PCB opening 22 and the second end 81 is positioned over a second transmit probe 29.

Figure 8A:
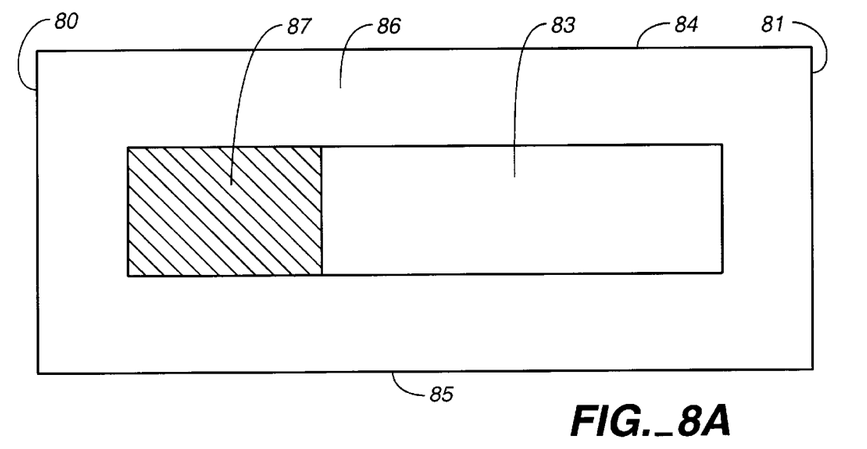
FIG. 8A–8B shows one embodiment of an enclosure used to form the waveguide shown in FIG. 2.
Figure 8B:
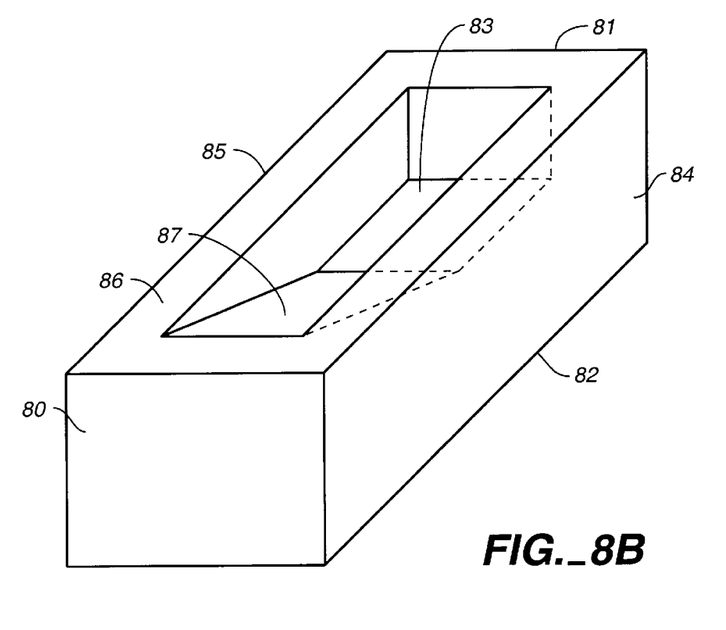

In order to ensure low loss the enclosure unit has metalized internal surfaces which provide low loss to the guided mode. The unit may also be a solid metal unit having low loss at microwave frequencies. Some metals that are appropriate for this purpose are aluminum, copper, silver, and brass. Aluminum is a lightweight, low cost unit which can be easily machined or cast in the proper form.

In one embodiment, the dimensions are 0.200 inches wide, 0.100 inches high, and 1.2 inches long including the taper area 87. In one embodiment in which the receive and transmit signals are separated by a relatively large frequency band, the waveguide structure has a cut-off frequency which is above the receive frequency. It is well known in the field of waveguide design that a waveguide has an associated cut-off frequency at which it will not propagate signals having a frequency below the cut-off frequency, $f_c$. For example, the waveguide structure can have a cut-off frequency of 29.6 GHz which is above a receive frequency of 28 GHz and below a 31 GHz transmit frequency. The length is set to provide the rejection of the receive frequency band required (about 60 dB in this case).

Alternatively, in another embodiment in which the receive and transmit signals are separated by a relatively small frequency band, the enclosed waveguide structure is designed to function as a bandpass filter waveguide which is tuned to accept transmit frequency signals and reject receive frequency signals.

Figure 5A:
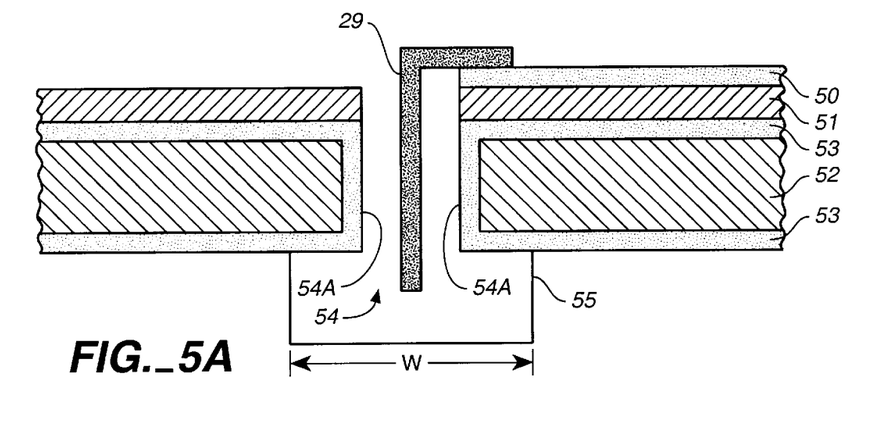
FIG. 5A shows an embodiment of a transmit probe used in the PCB transceiver I/O filter design shown in FIG. 4.

The second transmit probe 29 is attached to a microstrip 29A formed on the PCB and which, in turn, is attached to transmit circuitry (not shown). In the embodiment shown in FIG. 2, microstrip 29A is formed on PCB side 23A and the transmit probe 29 is attached to the microstrip such that it extends through a via 29B into the inner waveguide area 83 (FIGS. 2, 8A, and 8B) of waveguide 27. FIG. 5A shows an embodiment of the configuration of the TX probe 29 on PCB 23. A PCB dielectric 52 has formed on its top and bottom sides a ground plane 53. A dielectric layer 51 is formed on top of one of the ground planes. A via is formed in layers 51–53. The sides 54A of the via 54 are metalized. The TX probe 29 is attached to microstrip 50 and extends through via 54 into the cavity of the waveguide 55. The TX probe 29 is physically position in a second orientation at a 90° angle to the first orientation of RX probe. Hence in the embodiment shown in FIG. 2, the RX probe 26 is oriented in the same plane to the PCB 23 whereas the TX probe 29 is oriented orthogonally to the plane of the PCB 23.

Figure 5B:
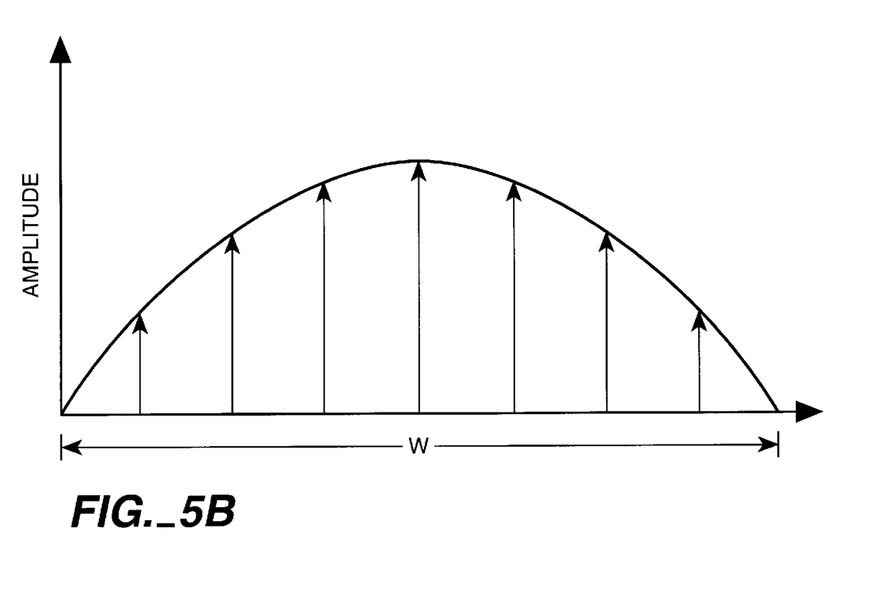
FIG. 5B shows the E-field distribution for the dominant TE10 propagating mode in the waveguide generated by the transmit probe shown in FIG. 5A.

Signals are generated by transmit circuitry (not shown) and are coupled onto microstrip 50 which then excites TX probe 29 causing it to emit signals into waveguide 55 (FIG. 5A) having a signal amplitude characteristic as shown in FIG. 5B. The transmit signals propagate through waveguide 27 from probe 29 to the other end of waveguide 27 attached over opening 22 and are emitted from feed waveguide 21 (FIG. 2). It should be noted that the slanted portion 27A of the waveguide 27 functions to direct the transmit signals out of the waveguide 27 while maintaining the signals orthogonal orientation of the transmit signals with respect to the receive signals.

Figure 4:
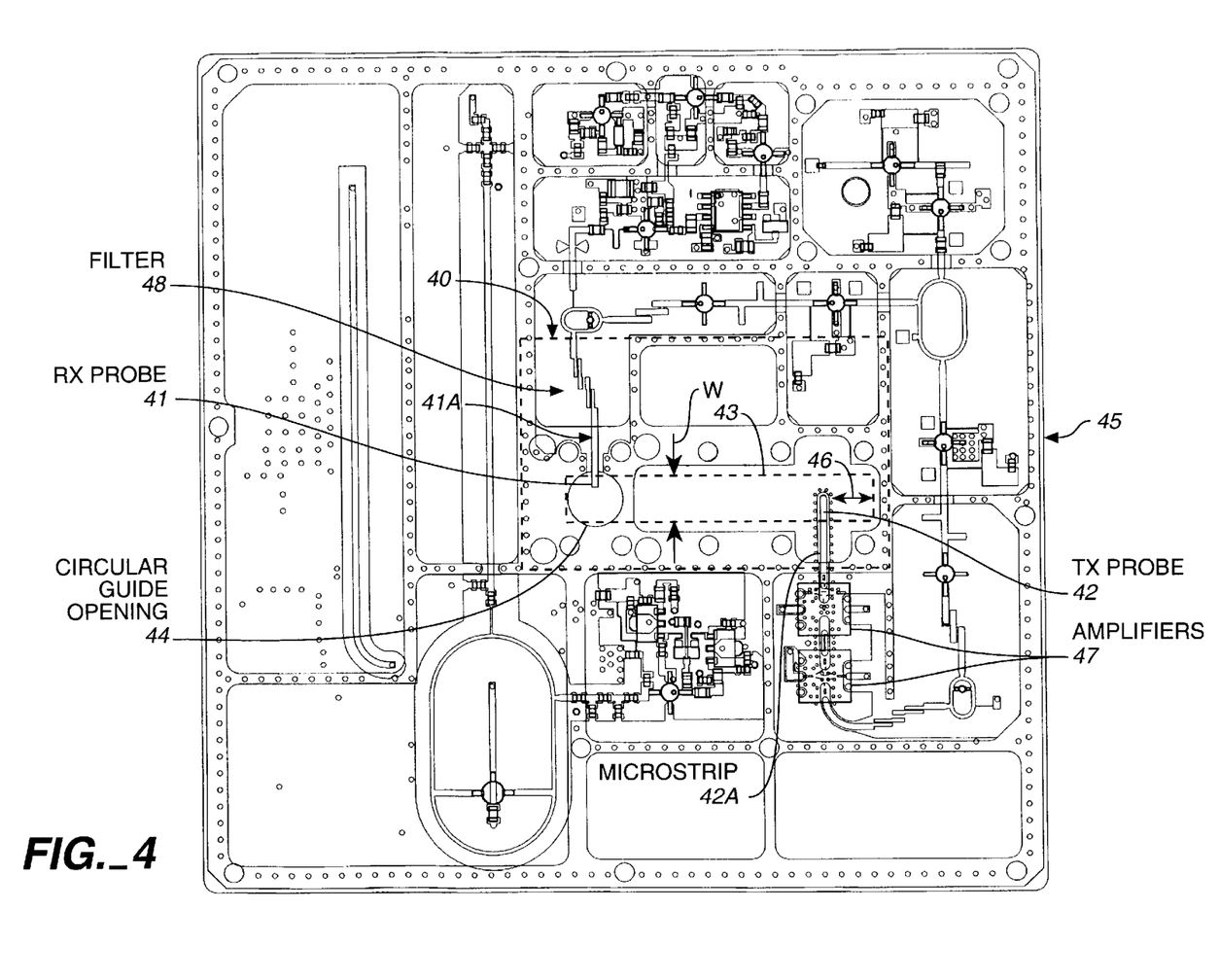
FIG. 4 shows a top view of an embodiment of the PCB transceiver I/O filter design shown in FIG. 2.

FIG. 4 shows a top view of the elements of one embodiment of the PCB I/O filter design 40. As shown, receive probe 41 is oriented horizontally and is in the plane of the PCB 45. It is positioned over the PCB circular guide opening 44. The transmit probe 42 is attached to microstrip 42A and extends through PCB 45 into the waveguide cavity area 43 formed by waveguide 27 as described above. The dashed lines represent that the waveguide area is formed on the opposite side of the PCB 45. It should be noted that as is well known in the field of waveguide design, the waveguide area is designed to extend past the probe 42 in the opposite direction of the transmit signal propagation path by a distance 46 (often referred to as the backshort area) so as to minimize reflections within the waveguide area 43 and optimize coupling of the transmit signal from the transmit probe into the feed waveguide. FIG. 4 shows the waveguide area 43 extending and encompassing a waveguide path between the transmit probe 42 and the circular guide opening 44.

Figure 3:
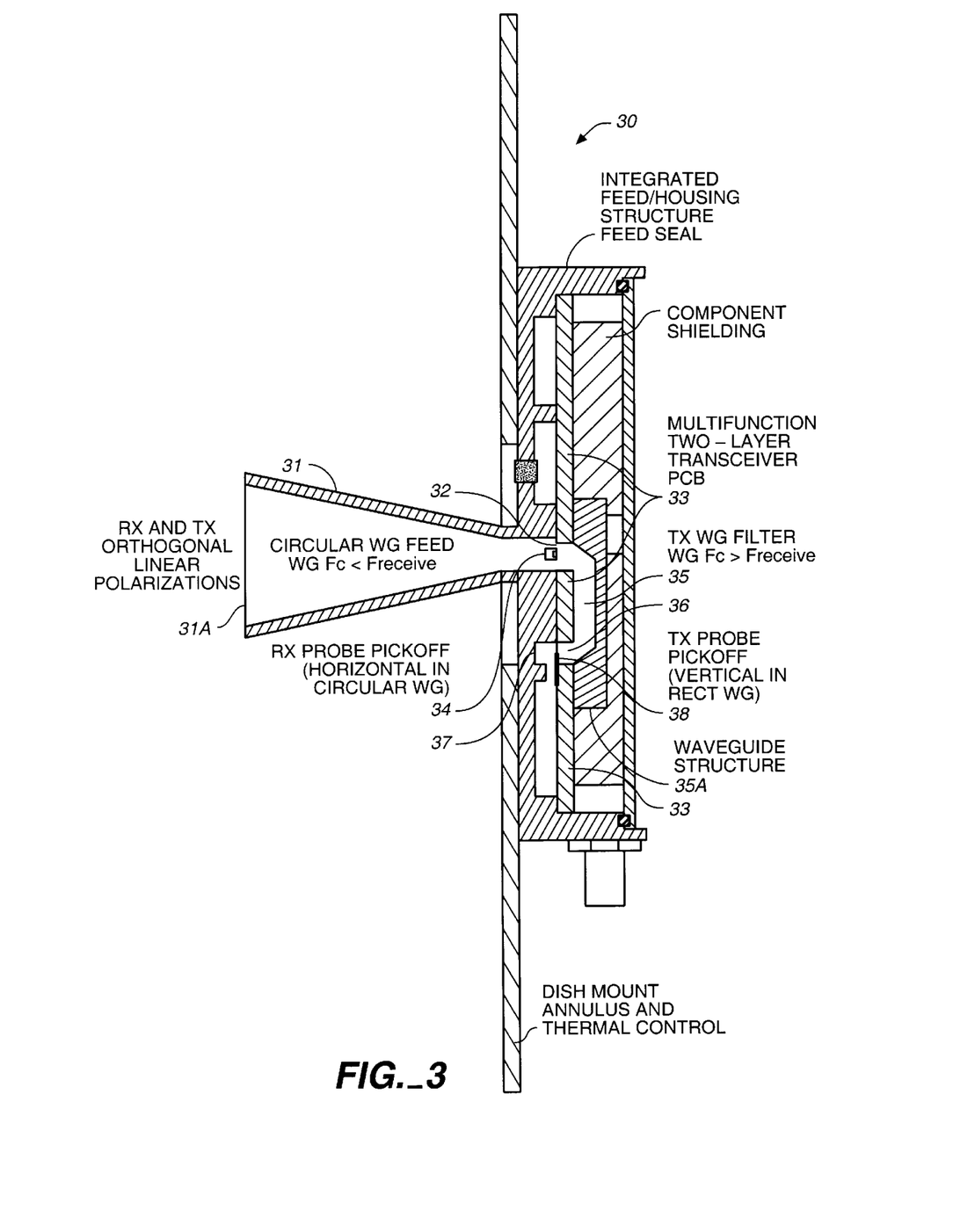
FIG. 3 shows a second embodiment of a PCB transceiver I/O filter design for providing signal isolation and polarization.

FIG. 3 shows a second embodiment of the I/O filter design 30 which includes a feed waveguide 31 having a first end 31A for transmitting and receiving signals and a second end fixedly attached to an opening 32 in PCB 33. An RX probe 34 attached to a microstrip (not shown) on PCB 33 is positioned to extend into opening 32. The probe is positioned horizontally in the opening in the same plane as the PCB. The RX probe 34 is excited by received signals which propagate into feed waveguide 31. The probe 34 couples the received signals to receive circuitry via the microstrip on PCB 33.

Figure 7:
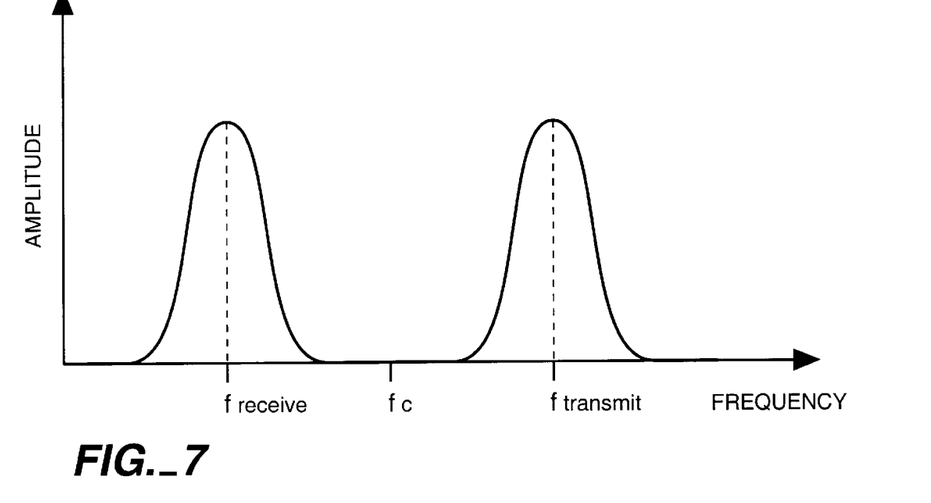
FIG. 7 shows how the waveguide cut-off frequency can be used to provide a method of filtering the receive signal when the band separation is sufficient.

The PCB I/O transceiver further includes a waveguide area 35 formed by waveguide structure 35A having a first end positioned over opening 32 and a second end positioned over a second opening 36 in PCB 33 which extends into a backshort area 37. A vertical TX probe 38 is attached to a microstrip (not shown) on PCB 33 and is positioned into the opening 36. The microstrip is coupled to transmit circuitry (not shown) and excites probe 38 causing it to emit transmit signals into waveguide 35, out opening 32, and through feed waveguide 31. As with the previous filter design shown in FIG. 2, in one embodiment the cut-off frequency of the waveguide area 35 may be set to be greater than the receive signal frequency range but less than the transmit frequency range such that signals having the receive freqeuncy range are rejected in waveguide 35 and signals in the range between the cut-off frequency and the transmit frequency are passed in waveguide 35. In particular, waveguide 35 is designed to have a dimension W (FIGS. 8A and 8B) such that its cut-off frequency is set to be greater than the frequency of the receive signal (i.e. $f_c > f_{receive}$, see FIG. 7). Hence, the receive signal does not propagate into waveguide 35. Moreover, the frequency of the transmit signal is greater than $f_c$ (i.e. $f_c < f_{transmit}$) so as to allow signals to propagate through the waveguide 35 out opening 32. In essence, the waveguide functions similar to the filter B.P. 15 shown in FIG. 1 which is tuned to the frequency of the transmit signals and rejects the receive frequency. Hence, the waveguide 35 also rejects any noise produced by amplifier 16 (FIG. 1) having the frequency in the receive signal range.

In addition, the RX probe 34 is physically oriented 90° with respect to the TX probe 38 so as to provide polarization isolation between the transmit and receive signals in the area of opening 32 and feed waveguide 31.

Waveguide 35 can obtain a significant amount of rejection. In particular, in the case of a 28 GHz receive signal and 31 GHz transmit signal with Fc at 29.66 Hz the waveguide filter 35 provides an attenuation of 60 dB/inch. In contrast, a typical bandpass filter implemented using several discrete microwave devices provides less rejection of the receive frequency (typically 30 dB down). In addition, discrete devices cost more than the simple enclosed waveguide structure (FIGS. 8A and 8B) attached to PCB 33. Hence, in accordance with the present invention isolation filtering is achieved by selecting receive and transmit frequencies such that the receive signal is below the cut-off frequency of the waveguide 35 and the transmit frequency is above the cut-off frequency.

In another embodiment, the waveguide structure can be designed to function as a bandpass filter waveguide which is tuned to accept transmit frequency signals and reject receive frequency signals.

Polarization isolation is achieved by positioning the transmit and receive probes at a 90° with respect to each other such that the E-fields of the transmit and receive signals are orthogonal to each other. By positioning the transmit and receive probes in this manner interaction between the transmit and receive signals becomes ideally null in the area of the feed waveguide 31 and opening 32, if the probes are perfectly orthogonal to each other. Hence, the orientation of the probes effectively functions as a orthogonal mode transducer ensuring polarization isolation.

It should be understood that the I/O filter design uses a waveguide filter to filter out signals in the receive frequency range in the transmit circuitry branch similar to bandpass filter 15 (FIG. 1). Moreover, orienting probes orthogonally provides polarization isolation similar to the O.M.T. 11 (FIG. 1). In order to ensure that signals in the transmit signal frequency range do not leak into the receive circuitry branch the I/O filter design may also include on the PCB a coupled filter 48 which is well known in the field of microwave PCB circuit design as shown in FIG. 4. Filter 48 is tuned to reject signals in the frequency range of the transmit signal such as bandpass filter 12 in FIG. 1. Hence, by including filter 48 into the I/O filter design, the functions of B.P. 15, B.P. 12, and O.M.T 11 are embodied in the I/O filter design shown in FIG. 4.

It should be understood that the transmit and receive probes, microstrips, and circuitry can be interchanged in the case in which the transmit signal frequency is less than the receive signal frequency. For instance, the receive signals may propogate through the waveguide filter, while the transmit signals are rejected in this area.

Hence, an I/O PCB filter design is described that provides both polarization and isolation filtering in a transceiver circuit design. Polarization filtering is achieved by orienting probes on the PCB so that the transmit and receive signals have associated E-fields that are orthogonal to each other. Frequency isolation filtering is achieved by an enclosed waveguide structure which is designed to isolate receive and transmit signals using the waveguides cut-off frequency or by designing the waveguide structure to function as a bandpass filter. The isolation filtering is also used so that noise in the frequency range of the receive signal generated in the transmit circuitry branch of a transceiver circuit is rejected so that it does not leak to the receive circuitry branch.

In the preceding description, numerous specific details are set forth, such as specific frequencies in order to provide a thorough understanding of the present invention. It will be apparent, however, to one skilled in the art that these specific details need not be employed to practice the present invention. In other instances, well known structures and components have not been described in order to avoid unnecessarily obscuring the present invention.

Moreover, although the components of the present invention have been described in conjunction with a certain embodiments, it is appreciated that the invention can be implemented in a variety of other ways. Consequently, it is to be understood that the particular embodiments shown and described by way of illustration is in no way intended to be considered limiting. Reference to the details of these embodiments are not intended to limit the scope of the claims which themselves recite only those features regarded as essential to the invention.

What is claimed is:

1. A transceiver apparatus on a printed circuit board (PCB) comprising:
    a first probe for being excited with received signals in a first frequency range and coupling said received signals to receive circuitry, said first probe oriented in a first position;
    a second probe coupled to transmit circuitry for generating, through excitation, transmit signals in a second frequency range, said second probe oriented orthogonal to said first probe such that said transmit signals are polarized essentially orthogonally with respect to said receive signals;
    an enclosed waveguide structure positioned between said first and second probes, said enclosed waveguide structure having first and second ends, a top closed portion, and a bottom open portion, said bottom open portion being fixedly attached to said PCB so as to form an enclosed waveguide area;
    wherein said first end of said enclosed waveguide structure is positioned over an opening in said PCB and one of said first and second probes is positioned at said opening, said other one of said first and second probes is positioned at said second end of said enclosed waveguide structure, and said enclosed waveguide structure provides frequency isolation between said transmit and received signals.

2. The transceiver apparatus as described in claim 1 wherein said first and second frequency ranges are in the microwave frequency range.

3. The transceiver apparatus as described in claim 2 further including a feed type waveguide having a first end for transmitting and receiving said transmit and receive signals and a second end fixedly attached to said opening in said PCB.

4. The transceiver apparatus as described in claim 2 wherein said enclosed waveguide has an associated cut-off frequency, and wherein one of said transmit and received signals has a frequency range which is less than said cut-off frequency and the other of said transmit and received signals has a frequency range that is greater than said cut-off frequency.

5. The transceiver apparatus as described in claim 2 wherein said enclosed waveguide is designed as a bandpass filter which rejects signals having a frequency range of one of said transmit and received signals and which passes signals having a frequency range of the other of said transmit and received signals.

6. The transceiver apparatus as described in claim 2 wherein said first probe is positioned in said opening at said first end and said second probe is positioned at said second end.

7. The transceiver apparatus as described in claim 2 wherein said second probe is positioned in said opening at said first end and said first probe is positioned at said second end.

8. The transceiver apparatus as described in claim 2 wherein said feed waveguide is a circular feed waveguide.

9. The transceiver apparatus as described in claim 2 wherein said enclosed waveguide is rectangular.

* * * * *